United States Patent [19]

Ginter

[11] Patent Number: 4,874,455

[45] Date of Patent: Oct. 17, 1989

[54] APPARATUS FOR FORMING ENDLESS TIRE REINFORCING BELTS

[75] Inventor: David J. Ginter, Clinton, Conn.

[73] Assignee: The Armstrong Rubber Co., New Haven, Conn.

[21] Appl. No.: 8,623

[22] Filed: Jan. 29, 1987

[51] Int. Cl.[4] .......................................... B65H 81/08
[52] U.S. Cl. .................... 156/397; 156/425; 156/440
[58] Field of Search .............. 156/117, 397, 177, 425, 156/181, 130, 439, 440; 152/533

[56] References Cited

U.S. PATENT DOCUMENTS

| | | | |
|---|---|---|---|
| 3,526,368 | 9/1970 | Sanders | 242/16 |
| 3,589,426 | 6/1971 | Varner | 152/361 |
| 3,598,166 | 8/1971 | Wells | 152/361 |
| 3,616,001 | 10/1971 | Addis | 156/177 |
| 3,642,532 | 2/1972 | Greene | 117/233 |
| 3,674,079 | 7/1972 | Varner | 152/533 X |
| 3,674,584 | 7/1972 | Klein | 156/173 |
| 3,695,228 | 10/1972 | King | 118/620 |
| 3,706,623 | 12/1972 | Klein | 156/394 |
| 3,720,569 | 3/1973 | Kimble | 161/57 |
| 3,720,570 | 3/1973 | Greene et al. | 161/58 |
| 3,721,599 | 3/1973 | Addis | 156/394 |
| 3,729,365 | 4/1973 | Greene | 161/57 |
| 3,748,203 | 7/1973 | Greene | 156/175 |
| 3,761,340 | 9/1973 | Klein | 156/397 |
| 3,761,341 | 9/1973 | Kimble | 156/446 |
| 3,770,042 | 11/1973 | Greene et al. | 152/361 |
| 3,941,644 | 3/1976 | Klein et al. | 156/433 |
| 4,002,789 | 1/1977 | Klein | 428/108 |
| 4,045,990 | 9/1977 | Klein | 72/190 |
| 4,061,524 | 12/1977 | Tolan | 156/175 X |
| 4,145,740 | 3/1979 | McClean et al. | 156/425 X |
| 4,600,456 | 7/1986 | Oswald | 156/117 |

Primary Examiner—Michael W. Ball
Assistant Examiner—Jeff H. Aftergut
Attorney, Agent, or Firm—St. Onge Steward Johnston & Reens

[57] ABSTRACT

Apparatus is provided for weaving a woven endless tire reinforcing belt on an endless weaving surface in a zig-zag pattern. The apparatus comprises input means for receiving information defining said zig-zag pattern; means for storing said pattern-defining information; central computer control means for reading said stored information and controlling the weaving of said belt as defined by said information; at least one endless weaving surface upon which said belt is woven; said weaving surface being continuously rotatable about an axis; means for continuously rotating said weaving surface about said axis, said rotating means being responsive to said central computer control means; at least one reinforcement guide means for supplying cord reinforcement to said weaving surface; and at least one means for reciprocating said guide means to effect the laying of said cord reinforcement on said weaving surface, said reciprocating means being responsive to said central computer control means. The central computer control means controls said rotating means and said reciprocating means to reciprocate said guide means in timed relationship to the rotation of said weaving surface to effect the laying of said cord reinforcement on said surface in said zig-zag pattern in accordance with said information.

9 Claims, 6 Drawing Sheets

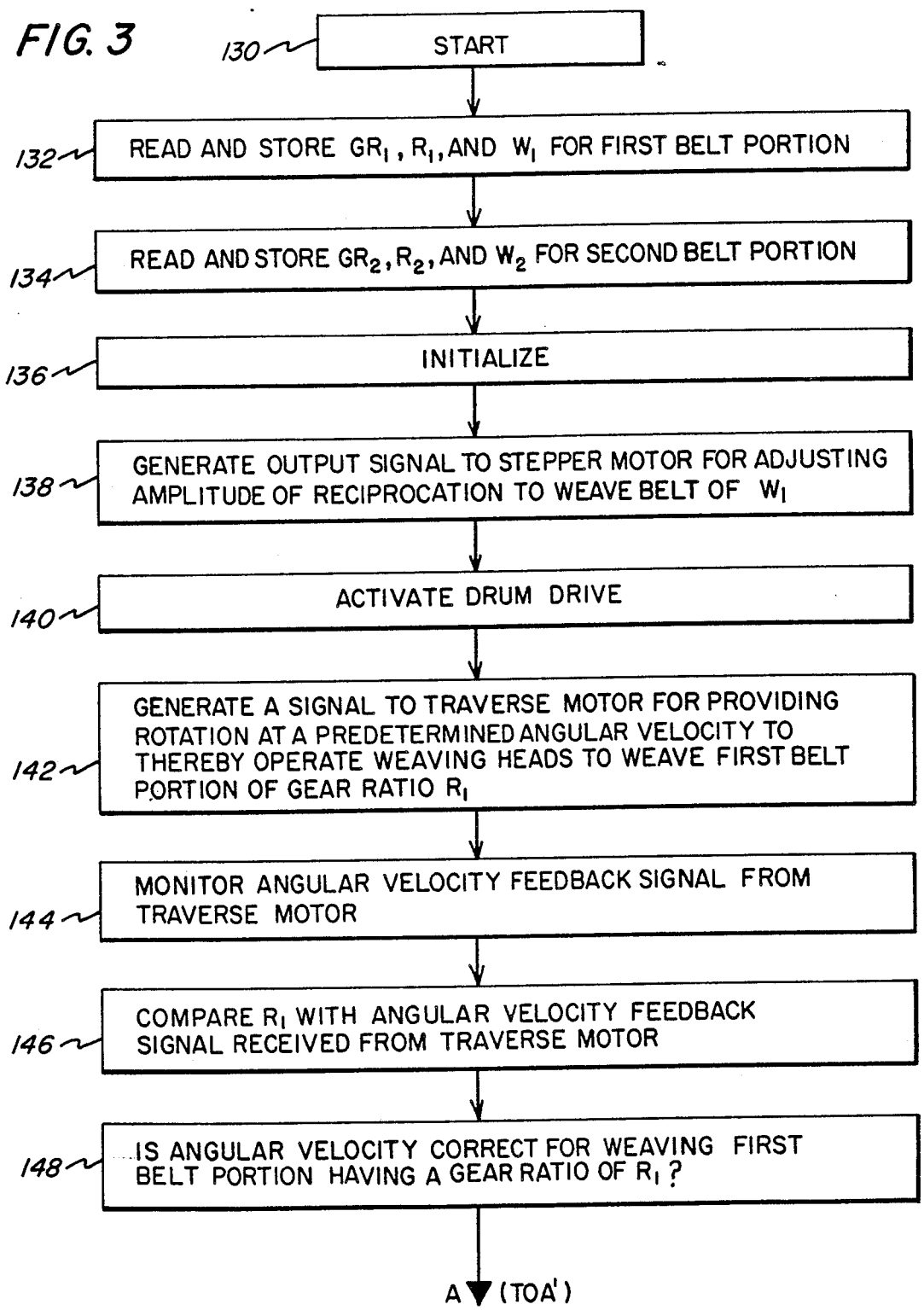

APPARATUS FOR FORMING ENDLESS TIRE REINFORCING BELTS

BACKGROUND OF THE INVENTION

1. Field of the Invention

The present invention relates to woven, endless tire reinforcement belts.

In recent years, endless woven tire reinforcement belts have been shown to provide a number of advantages over breaker belts of more conventional construction. According to the preferred method of production, these endless belts are woven from coated continuous reinforcement material by laying it in an ordered zig-zag pattern on the surface of a forming drum or other endless weaving surface.

It is an advantage of production that the woven belts are rapidly formed. Unfortunately, however, if it is desired to switch from production of reinforcement belts of one width to another, or one cord angle to another, or one thickness to another, it has been necessary in practice to make a number of adjustments to the weaving apparatus. These adjustments may be necessary, not just for a single production run, but also for each belt woven. Some of these adjustments may be mechanically complex and cumbersome, such that it is not economically feasible in a production setting to weave such belts. This problem is particularly acute if it is desired to weave a production series of single belts comprising multiple belt portions having different widths, thicknesses, or cord angles within each single belt.

It would be desirable to have a method and apparatus that would simplify the production of woven, endless tire reinforcement belts and provide flexibility in enabling rapid, economical changes in belt parameters such as width, thickness, and cord angle.

2. Discussion of the Prior Art

Tire reinforcement belt winding machines are known in the prior art. For example, U.S. Pat. No. 3,748,203 to Green shows in FIG. 1 thereof a schematic illustration of one form of apparatus for producing an endless reinforcement. In the '203 patent, the guides are interconnected by a cable and pulley arrangement. The drum and guides are driven by a motor. The guides are arranged through suitable mechanical linkage to reciprocate across drum surface transversely to the direction of rotation of the drum. A gear train includes a suitable arrangement of gears to control the movement of the guides with respect to the drum so that the strips are laid on the drum surface in a predetermined pattern.

The disadvantages of the '203 patent include the limitations imposed by the gear train. If it is desired to weave belts or belt portions having different predetermined patterns, such as differing cord angles, it is necessary to change the gearing ratios, such as for example by physically changing the gears. This is time consuming as well as cumbersome and can be prohibitively so where it is desirable to weave different patterns for each single tire reinforcement belt produced. Also, no provision is made in the '203 patent for producing belts where the two guides lay down strips having different cord angles that may differ from belt portion to belt portion within a single belt.

U.S. Pat. No. 4,600,456 to Oswald also shows a method and apparatus for forming woven endless tire reinforcing belts wherein the drive for the drum is a first electric motor and the drive for the weaving heads is a second electric motor. The relative speeds of the motors are synchronized by a phase lock loop controller and associated circuitry or other suitable servomotor control system. The phase lock loop controller will preferably be of the high gain, high accuracy type and can be set to a desired ratio of speeds for the two motors by suitable means such as a digital thumbwheel switch. In the preferred embodiment, the speed of the motor for the weaving heads will be monitored by an encoder which provides a reference signal to the phase lock loop controller. The speed of the drum drive motor will be monitored by an encoder, which also provides a feedback signal to the controller. The corrected drum drive speed is then provided to the motor by the controller. The guide means are arranged to function in mirrored relationship to one another.

The disadvantages of the '456 apparatus and method include the limitations that no provisions are made for producing belts wherein the cord angles may differ from belt portion to belt portion. For example, no provisions are made in the '456 patent for weaving the type of improved belts disclosed in copending application Ser. No. 929,602, filed Nov. 12, 1986, such as where a reinforcing belt is disclosed including a first belt portion having a first width $W_1$ and cord angle $A_1$ with a second belt portion having a second, narrower width $W_2$ and a cord angle $A_2$ woven onto the radially outward side of the first belt portion.

SUMMARY OF THE INVENTION

Apparatus is provided for weaving a woven endless tire reinforcing belt on an endless surface in a zig-zag pattern. The apparatus comprises input means for receiving information defining the zig-zag pattern, means for storing the information, central computer control means for reading the stored information and controlling the weaving of the belt as defined by the information, at least one endless weaving surface, means for continuously rotating the weaving surface under computer control, at least one reinforcement guide means for supplying cord reinforcement to the weaving surface, and at least one means for reciprocating the guide means under computer control. The computer controls the rotating means and the reciprocating means to reciprocate the guide means in timed relationship to the rotation of the weaving surface to effect the laying of said cord reinforcement on said surface in said zig-zag pattern in accordance with said information.

It is an object of the present invention to provide a programmable apparatus and method for forming endless tire reinforcing belts.

It is an object of the present invention to provide apparatus for forming endless tire reinforcing belts wherein the width of the belts woven can be readily changed from one belt portion to another.

It is a further object of the present invention to provide apparatus and a method for forming endless tire reinforcing belts wherein the cord angle of the belts woven can be readily changed from one belt portion to another.

It is a further object of the present invention to provide apparatus and a method for forming endless tire reinforcing belts wherein the thickness, or ply, of the belts woven can be readily changed from one belt portion to another.

Further attendant objects and advantages of the present invention shall become apparent from the following brief description of the drawings in light of the detailed description of the preferred embodiments.

DETAILED DESCRIPTION OF THE PREFERRED EMBODIMENT

Figure 1:
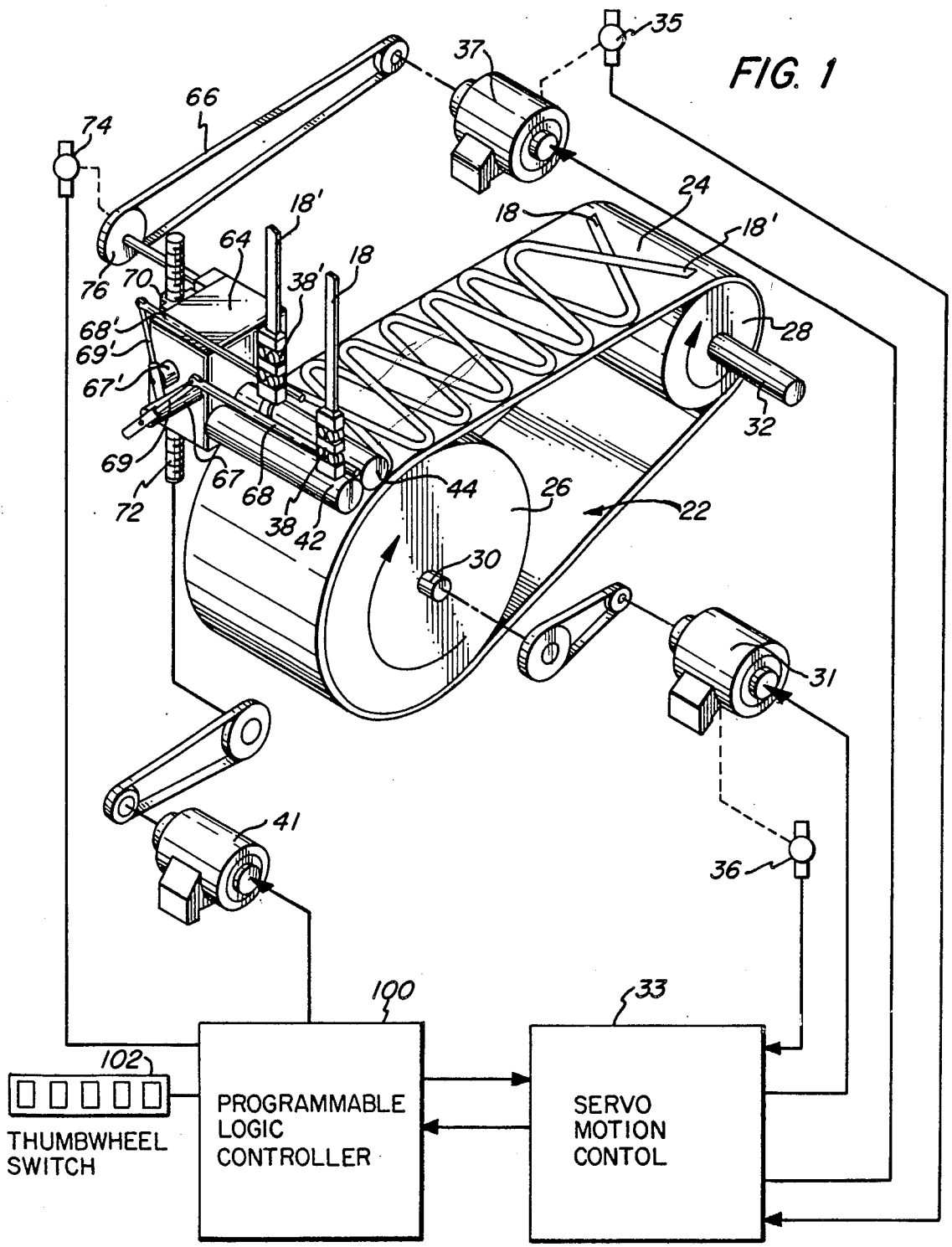
FIG. 1 is a schematic diagram of one preferred embodiment of the present invention.
Figure 2:
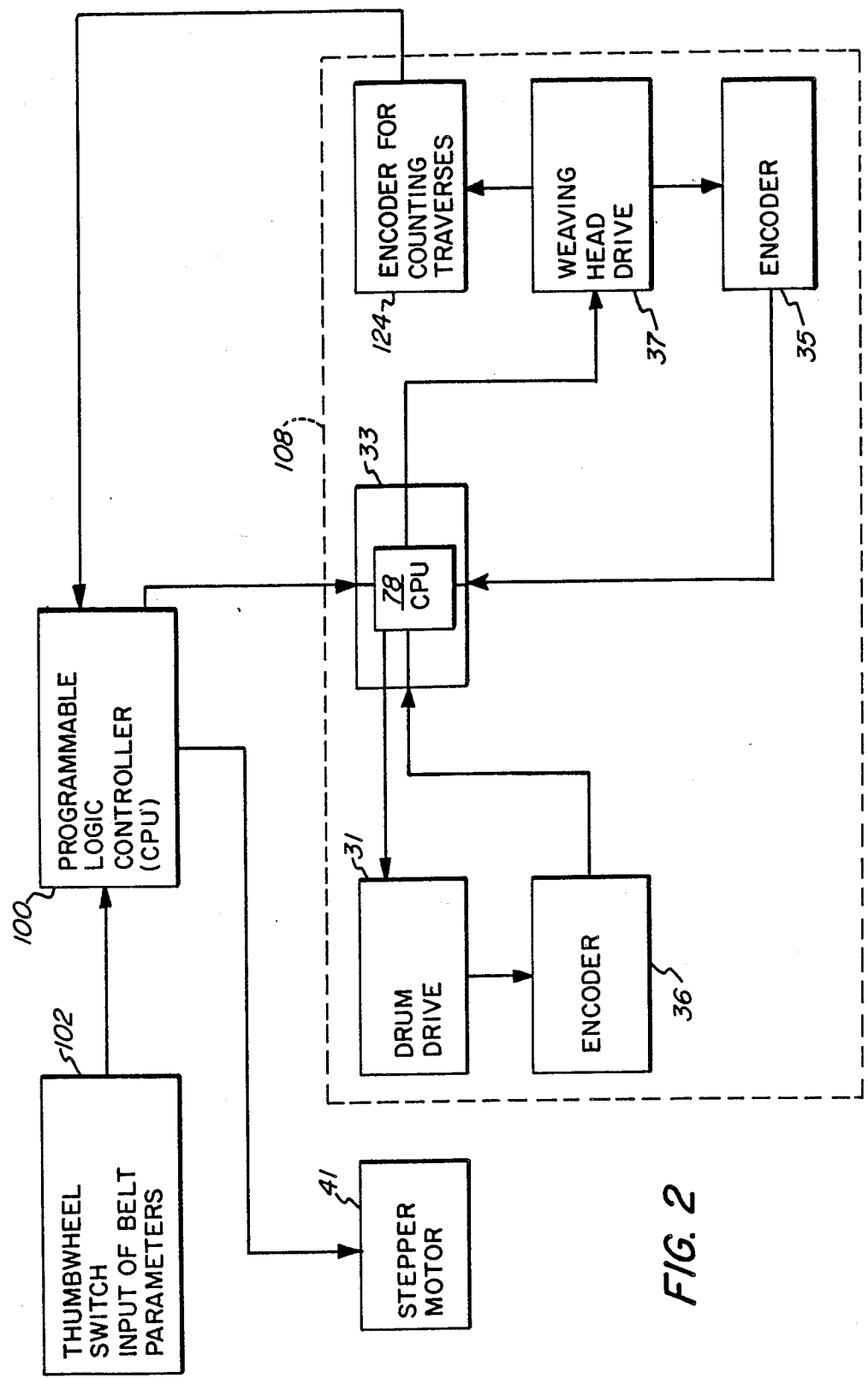
FIG. 2 is a block diagram of the apparatus of the FIG. 1.

The schematic diagram of FIG. 1 read in conjunction with the block diagram of FIG. 2 best illustrates a first preferred embodiment of the present invention.

FIG. 1 schematically represents a preferred apparatus according to the present invention in operation during the early stages of formation of an endless tire reinforcing belt. As shown, the apparatus includes a flexible endless belt 22, which may be a multiple ply belt of reinforced rubber or of stainless steel having a thickness of from about 0.032 to 0.035 inches. The outer surface 24 of the endless flexible belt 22 comprises an endless weaving surface upon which the coated continuous cord reinforcement strips 18 and 18' are laid to form the reinforcing belt. The inner surface of the endless flexible belt 22 may have means such as a "V"-shaped projection (not shown) to mate with a complimentary notch in support members to assure tracking.

To support the endless weaving surface carried on the flexible endless belt 22, means comprising a plurality of support members, here shown as cylindrical members 26 and 28 are provided. If desired, a greater number of support members can be provided. All of the support members are rotatable about spaced parallel axes, here shown as defined by the centers of shafts 30 and 32. Due to the buildup of tension during winding, means should be provided for securely locking the shafts at the desired spacing. According to the embodiment shown in FIG. 1, the support member 26 is the driven member with support member 28 being driven by it due to the endless flexible belt 22 being tensioned thereover during operation.

Member 26 is driven by means operatively engaged with shaft 30 to cause rotation in the direction shown by the arrow and movement of the belt being formed in a generally left-to-right direction in the drawing. Suitable drive means preferably including a servomotor 31, appropriate gearing, and a phase lock loop or other servomotor control system, as will be explained in more detail below, are provided. Any suitable means for rotating the weaving surface can be used, so long as the rotating means such as for example servomotor 31 is responsive to control signals to rotate the weaving surface at a controlled angular velocity.

It is understood that a weaving drum means may be substituted for the weaving belt of FIG. 1. By way of example only, such a weaving drum apparatus is disclosed in U.S. Pat. Nos. 3,706,623 to Klein or 3,761,340, also to Klein. The use of a weaving belt or drum is a design choice that is not part of the present invention.

The embodiment shown in FIG. 1 is capable of laying two coated continuous cord reinforcement strips on the endless weaving surface 24 simultaneously. This is currently the preferred mode of operation, however, the same principles apply regardless of the number of cord reinforcement strips employed, whether it be one or a greater plurality.

Each of the strips, 18 and 18' are supplied to the endless weaving surface 24 by independent reinforcement guide means shown generally as 38 and 38'. Because each of these means functions in the same manner, except that one is the mirror image of the other, the operation of only reinforcement guide means 38 will be described in detail. The like parts on the other means will be the same with like parts performing like functions having the reference number distinguished in the drawing by the use of prime numbers.

Both of these reinforcement guide means 38 and 38' can be simply and effectively moved in the requisite timed relationship to the movement of the weaving surface by operable engagement through suitable gearing with a traverse motor 37, which is synchronized with drum drive 31 for the endless weaving surface. Traverse motor 37 can be any suitable means for reciprocating the guide means and is preferably a servomotor. Drum drive 31 is also preferably a servomotor. This engagement is schematically indicated in the drawing of FIG. 1.

Traverse motor 37 operates cam drive 64 through pulley arrangement 66. Cam drive 64 converts the rotational output of motor 37 to reciprocational motion by conventional means not forming part of the present invention. Reciprocational motion is output on arms 67 and 67'. This reciprocational motion is transmitted to weaving heads 38 and 38' by pump rods 69 and 69'. Weaving heads 38 and 38' are operatively connected to guide members 68 and 68'. U.S. Pat. No. 4,061,524 to Tolan describes such an arrangement as would be suitable for the present invention.

The relative speeds of motors 31 and 37 are synchronized by phase lock loop controller 33 and associated circuitry or other suitable servomotor control system. The phase lock loop controller will preferably be of the high gain, high accuracy type and can be set to a desired ratio of speeds for the two motors by signals issuing from the programmable logic controller. The speed or angular velocity of motor 31 will be monitored by encoder 36 which provides a reference signal, or angular velocity feedback signal, to the control means such as phase lock loop controller 33.

The speed or angular velocity of motor 37 will be monitored by encoder 35 which provides a reciprocation feedback signal to the control means such as controller 33. The angular velocity of the motor 37 is directly related to the speed of reciprocation of the guide means or weaving heads 38 and 38'. By controlling this angular velocity, the reciprocation speed can be controlled, thereby controlling the cord angle at which the reinforced strips are laid on the weaving surface.

Computer means compares the weaving surface angular velocity feedback signal and the reciprocation feedback signal with information $A_n$ defining the desired cord angle. Any corrected reciprocation speed if necessary is then provided to motor 37 by the controller 33.

In operation, an individual coated continuous reinforcement strip 18 is fed between counter-rotating rollers 42 and 44, which are operable to lay the strip under pressure against endless weaving surface 24.

The movement of the reinforcement guide means 38 and 38' back and forth in a direction generally transverse to the direction of movement of the endless weaving surface 24 is achieved by moving guide means 38 and 38, back and forth on traverse rods 68 and 68' as driven by pump rods 69 and 69'.

It can be most easily seen from strips 18 and 18' positioned on weaving surface 22 in FIG. 1 that the width of the belt portion woven by guide means 38, referred to for convenience only as the right-hand weaving head and denoted by the distance indicated as 39 in FIG. 1, corresponds to the amplitude of reciprocation of guide means 38. That is, the greater the distance of travel permitted for traverse rod 68, the greater will be the amplitude of reciprocation and therefore the width of the belt portion woven by weaving head or guide means 38. The width of the belt portion woven by guide means 38' is a mirror image of that portion woven by guide means 38.

A preferred apparatus for adjusting the amplitude of reciprocation of the weaving heads or other guide means is disclosed in U.S. Pat. No. 4,061,524 to Tolan, which patent is entitled Adjustable Traverse Tire Belt Winding Apparatus.

The additional improvement of the present invention includes stepper motor 41 and associated mechanical linkage operatively connected to the screw and nut assembly 70 and 72 to cause cam drive 64 to be moved with respect to traverse rods 68 and 68, As described in the '524 patent, the distance that the traverse rods move in each stroke between reversals will therefore be changed.

The stepper motor arrangement of the present invention provides a means of controlling the amplitude of reciprocation of guide means 38 by signals sent to stepper motor 41. Guide means 38' is in mirrored relationship thereto. Stepper motor 41 is operatively connected to a central computer control means, such as the programmable logic controller 100, which controls the state of stepper motor 41 to weave a belt portion as defined by data inputs to the logic controller. This is explained in further detail hereinafter.

Figure 4:
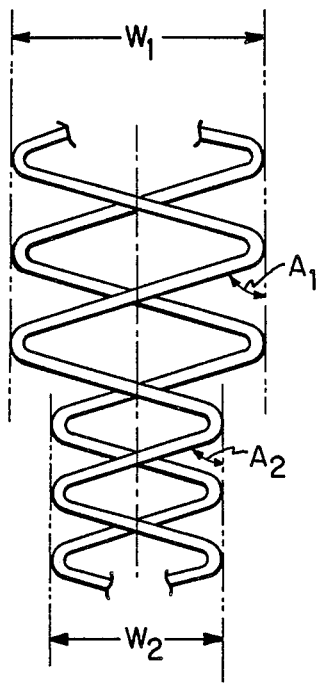
FIG. 4 is a schematic representation of one desirable zig-zag pattern for tire reinforcement belts that can be woven with the apparatus and method of the present invention.

Because of the flexibility afforded by the arrangement of the present invention, a single tire reinforcing belt can be woven to include a first belt portion of width $W_1$ with a second belt portion of $W_2$ woven on the radially outward side thereof. The second belt portion $W_2$ can also have a cord angle different from the first belt portion simply by changing the speed of traverse motor 37 relative to drum drive 31 under computer control. Such a reinforcing belt is depicted schematically in FIG. 4. The details and advantages thereof are disclosed in copending application Ser. No. 929,602.

Stepper motor 41, which can also be any other suitable means for adjusting the amplitude of reciprocation, is responsive to control signals to weave a belt portion of width $W_1$, thereafter a belt portion of width $W_2$, and so on up to a belt portion of width $W_n$.

The zig-zag pattern on the coated continuous cord reinforcement strip within the endless tire reinforcing belt being formed is achieved by timing the movement of reinforcement guide means 38 and 38' with the movement of the endless weaving surface 24, as described above. The cord reinforcement is applied to the endless weaving surface in a zig-zag pattern, being positioned across the surface from one side to the other. The angle of the cord reinforcement strip to the edges of the belt is reversed and the lengths of the cord reinforcement between reversals are interleaved with lengths disposed at an opposite angle along at least one line substantially parallel to and intermediate the edges of the belt.

For one especially preferred embodiment, the parameters of the belt are related according to empirical relationships, which are generally described in the following manner $$\frac{C \cdot \tan A}{2 \cdot W} = \frac{EPI \cdot C \cdot D \cdot \sin A}{P \cdot M \pm 1} = GR$$

wherein C is the circumference of the reinforcing belt, A is the smaller angle between the cord reinforcement and the edge of the reinforcing belt, W is the width of the reinforcing belt measured perpendicular to the edges, EPI is the number of cord reinforcements per inch measured perpendicular to the cord lengths, P is an integer and equal to one plus the total number of interleaving lines parallel to and intermediate the edges of the reinforcing belt, M and D are two integers having no common factor and which render $$\frac{P \cdot M \pm 1}{D}$$

an integer with D being less than P, and D and P have no common factor. GR is the number of repeating cycles of the cord reinforcement edge and back to the same edge for each circumference of the reinforcing belt. This is, however, at best an approximation and does not hold true for all desired patterns when wound on the apparatus of the invention. There are several factors which make mathematical predictability difficult with this apparatus. Among these are, the changing effective radius and effective velocity of the forming surface. However, with the formula as a guide, the desired pattern can be obtained reproducibly through limited trial and error.

FIG. 2 shows a block diagram of the present invention. Programmable logic controller 100, comprising at least one central processing unit, provides central computer control means for controlling the weaving of the belt in accordance with parameter data input through thumbwheel switch 102. The programmable logic controller (PLC) 100 then outputs control signals to stepper motor 41 for controlling the belt portion widths as set forth above.

In addition to issuing signals to stepper motor 41 for controlling the belt widths, PLC 100 also controls the system for synchronizing the weaving surface movement with the transverse reciprocation of the guide means or weaving heads 38 and 38'. This timing system is indicated generally by the components encompassed by dotted line 108 and includes the main components of drum drive 31, weaving head drive or traverse motor 37, and phase lock loop system 33. Encoder 36 provides rotational feedback information from drum drive 31 to the phase lock loop system 33. Encoder 35 provides reciprocational feedback information to phase lock loop system 33 for the weaving heads. Encoder 124 is operatively connected to the weaving head drive for providing traverse counting feedback information back to PLC 100.

Thumbwheel switches 102 as shown in FIG. 2, and also as shown in conjunction with the controller 100 in FIG. 1, are for receiving data defining the belt pattern in terms of belt widths, belt cord angles, and belt plies or thicknesses. Controller 100 in conjunction with switches 102 includes means for reading and storing appropriate inputs that are representative of the zig-zag pattern, such as $W_n$, $A_n$, $R_n$, and $GR_n$ as described in detail below. The values of the parameters $W_n$, $A_n$, $R_n$, and $GR_n$ are chosen by the tire designer and are not considered part of the present invention.

The different belt patterns that may be desired may be requested of the apparatus of the present invention by the appropriate inputs to the thumbwheel switches 102. Any given belt may be made up of n belt portions $1,2,\ldots,n-1,n$, wherein the nth belt portion is woven on the radially outward side of the $(n-1)$th portion.

For example, it may be desirable to weave a reinforcement belt wherein the radially inward belt portion is of width $W_1$ and cord angle $A_1$ and thereafter a second belt portion of width $W_2$ and cord angle $A_2$ is superposed on the radially outward side of the first belt portion. Such a belt and the advantages thereof are described in copending application Ser. No. 929,602, which is hereby incorporated by reference. Theoretically, additional nth belt portions could be woven to form a belt comprising $1,2,\ldots,n-1,n$ portions radially superposed, each having its own width. Accordingly, the thumbwheel switches are preferably adapted to receive information specifying the width $W_1, W_2, \ldots, W_{n-1}, W_n$ of the successive belt portions.

In addition to the belt parameters $W_n$ for the nth portion, any belt to be woven is also characterized by the cord angle A. The cord angle A is defined as the smaller angle between the cord or strip reinforcement and the edge of the reinforcing belt. The cord angle A is determined by the timed relationship between the rotation of the weaving drum as compared to the rate of reciprocation of guide means 38 and 38' on the other hand. The faster the drum rotates in relationship to the reciprocations, the smaller is the cord angle A, and vice versa.

The cord angle A can also be expressed in terms of a gear ratio R, in that a specific gear ratio corresponds to a given cord angle. The "gear ratio" literally describes the gear ratio needed in a mechanical, gear driven system such as that of the '203 patent to achieve a certain cord angle. The PLC 100 and the phase lock loop system 33 are preferably capable of taking the gear ratio information and converting it to information for controlling the rotation and reciprocation to achieve the desired cord angle A.

It may also be desirable to change the gear ratio R for each belt portion $1,2,\ldots,n-1,n$ making up a specific belt. Accordingly, it is necessary to specify $R_1, R_2, \ldots, R_{n-1}, R_n$.

In addition to belt parameters $W_1, W_2, \ldots, W_{n-1}, W_n$ and $R_1, R_2, \ldots, R_{n-1}, R_n$, it is also desirable to specify the thickness or number of plies for the various belt portions. The preferred way of doing this is to specify the number of traverses GR. A traverse is defined as one complete cycle of reciprocation for a weaving head such as guide means 38. The number of traverses will establish how many plies are woven, in particular whether the belt or belt portion will be a one, two, three, or more ply belt.

The number of traverses GR necessary to weave a belt of a given ply is generally known in the art and is not part of the present invention.

The number of traverses is counted by encoder 74, which is operatively connected by suitable linkage to pulley 76 of cam drive 64. Encoder 74, which can be any suitable counting means, counts the number of reciprocations of the weaving heads. Encoder 74 is operatively connected to controller 100, which continuously compares the number of traverses actually woven with the number of desired traverses $GR_n$ for the nth belt portion. The controller 100 generates control signals to stepper motor 41 and also to drum drive 31 and traverse motor 37 through phase lock loop system 33 to begin the weaving of the nth belt portion after the $(n-1)$th belt portion has been woven.

Just as the different belt portions $1,2,\ldots,n-1,n$ may have varying widths and cord angles, so may the different portions have different plies or thicknesses indicated by $GR_1, GR_2, \ldots, GR_{n-1}, GR_n$.

The programmable logic controller 100 reads the thumbwheel switch settings and stores the data $GR_n, R_n$, and $W_n$. PLC 100 preferably comprises a programmable microcomputer chip set.

The PLC 100 as described more fully in detail below can then generate control signals representative of $W_n$ to stepper motor 41. The PLC 100 also generates control signals representative of $R_n$ to the timing system 108, in particular the phase lock loop system 33. The phase lock loop system 33 may itself have a computer control timing means for further generating control signals to the traverse motor 37 and drum drive 31 as described in more detail below. These signals are preferably digital pulses, although other signal waveforms can be used as a matter of design choice. The PLC 100 can also generate START and STOP signals to drum drive 31 and weaving head drive 37.

The phase lock loop system 33 can be any suitable control system that accomplishes the timing or synchronization function as already described above with respect to FIG. 1. In a particularly preferred embodiment, system 33 includes a computer control timing means, such as a central processing unit 78, for controlling traverse motor 37 and drum drive 31 in the appropriate timed relationship. This computer control timing means is under the further control of programmable logic controller 100, in that controller 100 directs unit 78 how to control the timed relationship.

The PLC 100 receives signals representative of the number of traverses counted by encoder 124. When the number of traverses counted corresponds to the desired number of traverses for a particular thickness or ply, then the PLC 100 issues control signals for changing the belt parameters for a second belt portion, or if the belt is completed, a STOP signal to the drum drive 31 and also a STOP signal to the weaving head drive 37.

Figure 3:
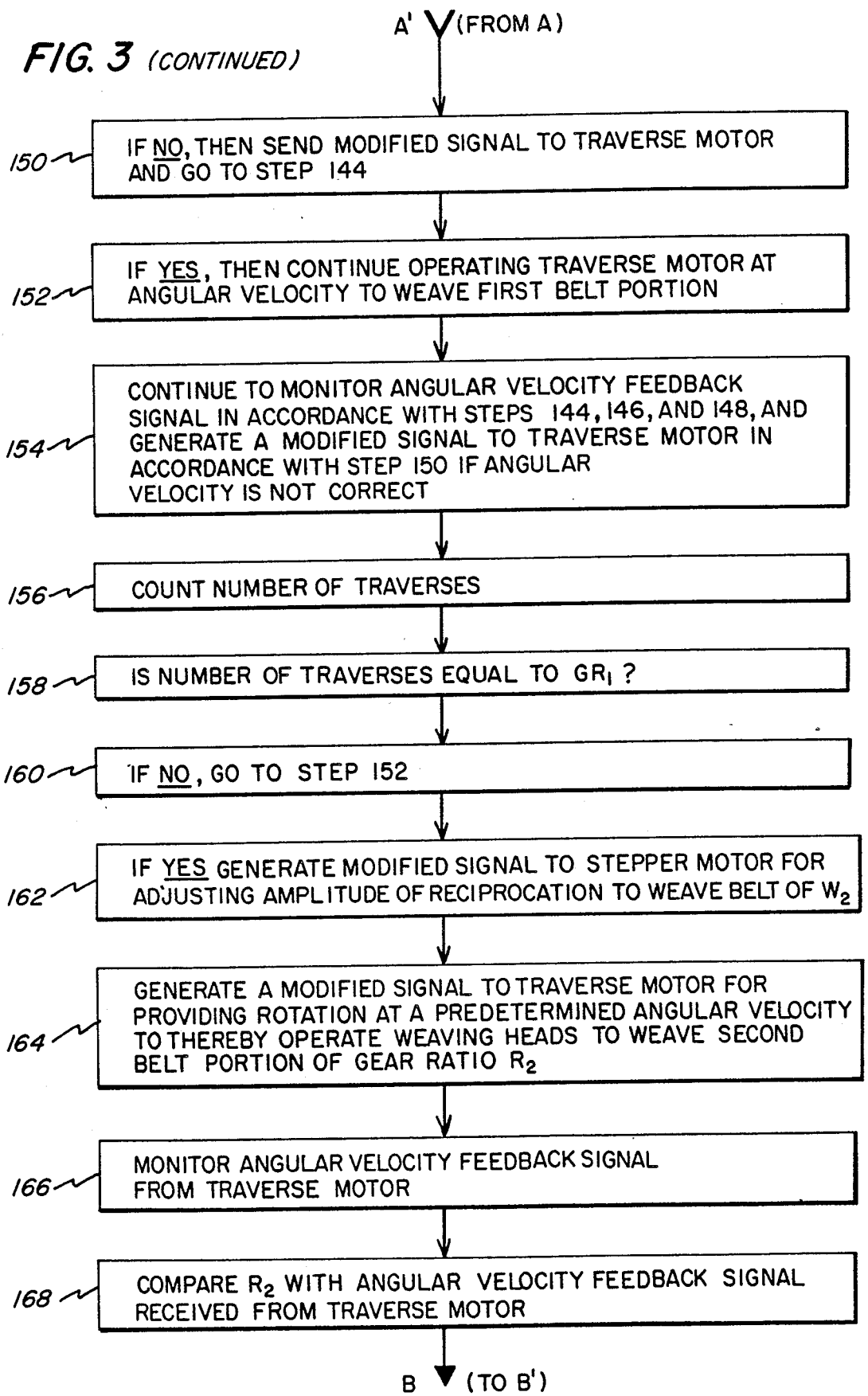
FIG. 3 is a flow chart depicting the method of the present invention using the apparatus of FIG. 1.
Figure 3:
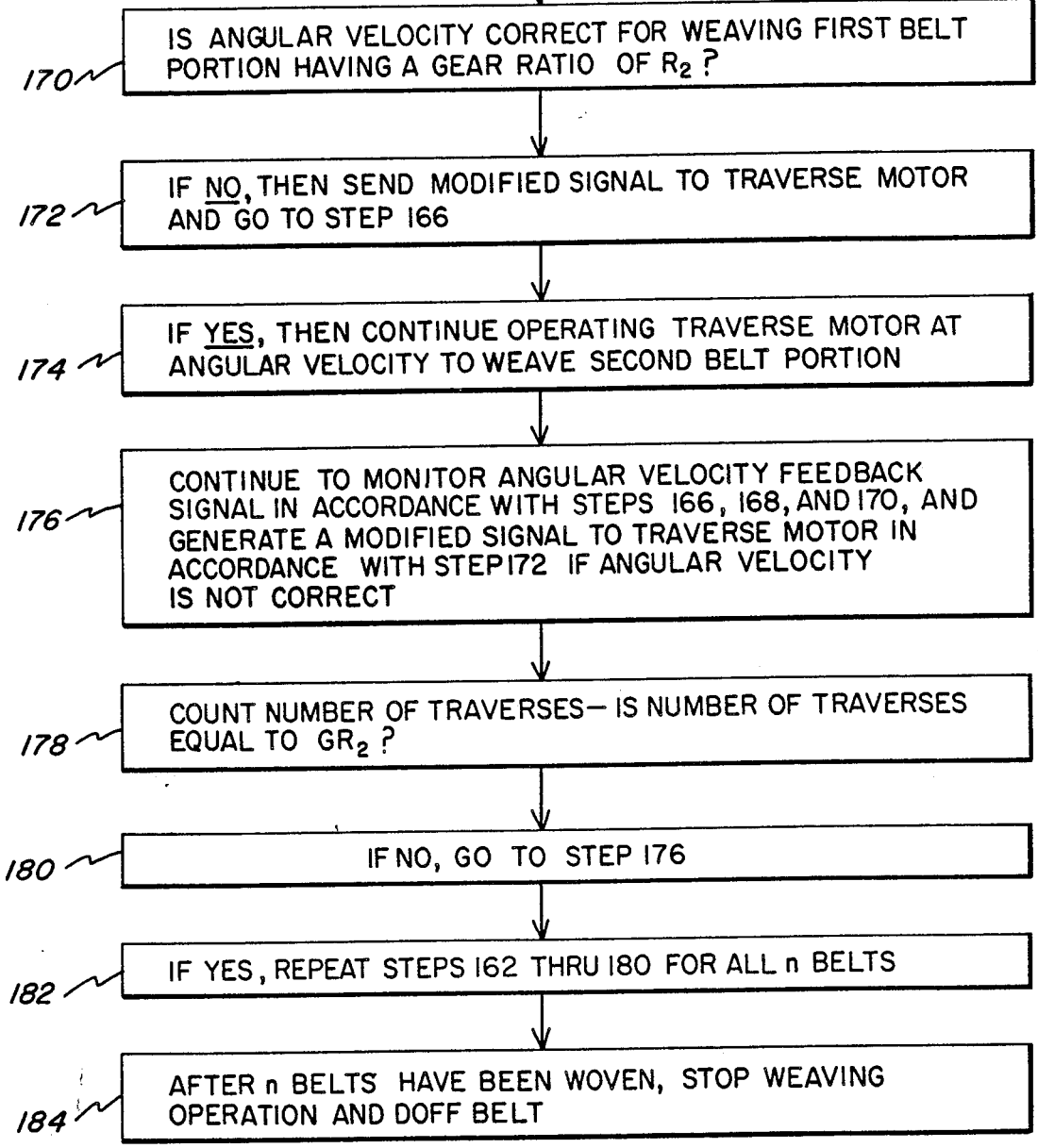

The apparatus of the present invention may be more clearly understood in conjunction with the flow chart shown in FIG. 3.

Box 130 represents the routine power up stage, where the appropriate power supplies for the motors and control circuitry are energized.

After the PLC 100 and associated circuitry has been energized, PLC 100 reads and stores the various belt parameters from the thumbwheel switches 102 for the first belt portion as indicated by box 132 in FIG. 3. The parameters for the belt to be woven will include the number of traverses $GR_1$; the cord angle, perhaps expressed in terms of the gear ratio $R_1$, for the weaving head; and the belt width $W_1$. These parameters for the first belt portion are stored in an appropriate memory.

This process is also completed for the second belt portion by reading and storing the parameters $GR_2$, $R_2$, and $W_2$ at box 134. This process may be completed for all n belt portions if there are more than two such portions.

Controller 100 in conjunction with phase lock loop system 33 generates control signals to weave belt portion 1, or the first belt portion, in accordance with parameters $GR_1$, $W_1$, and $A_1$. Thereafter, the (n−1)th belt portions are woven up through the nth portion, the nth portion being on the radially outward side of the (n−1)th portion.

The system is initialized at box 136. That is, the motors 31, 37, and 41 are properly set to their beginning or initial state and the PLC 100 is likewise initialized.

After initialization, PLC 100 at box 138 generates an output signal to stepper motor 41 for adjusting the amplitude of reciprocation to weave a belt of width $W_1$. This signal is preferably in the form of a series of discrete pulses. Stepper motor 41 responds by driving ball screw 72. Ball screw nut 70 in turn responds by traveling along screw 72 and carrying with it cam drive 64. Output arms 67 and 67' from cam drive 64 therefore may engage pump rods 69 and 69' at different points along their length to result in different amplitudes of reciprocation for guide means or weaving heads 38 and 38'.

When the stepper motor 41 is properly set for $W_1$, the drum drive 31 is activated (box 140) and the endless weaving surface is rotated past the weaving heads 38 and 38'

As shown at box 142 an output signal is transmitted to the traverse motor 37, to provide shaft rotation at a predetermined angular velocity $V_1$ necessary to operate or reciprocate the weaving heads to weave the first belt portion having a gear ratio $R_1$, which may also correspond to a particular cord angle $A_1$ as explained above. This output signal may be in the form of a series of discrete digital pulses or an analog signal or a combination of the two, depending upon the particular control system and associated circuitry used. The specific circuitry used is a design choice not forming a part of the present invention.

A feedback signal is read back from traverse motor 37 (box 144) through encoder 35 or other suitable feedback means from which can be determined the angular velocity of the motor 37. The drum drive speed is monitored through encoder 36. Accordingly, it is determined by an appropriate comparison means whether the angular velocity of motor 37 is that velocity necessary to weave a belt portion having a gear ratio $R_1$ (box 146). If the angular velocity is not correct for weaving the first belt portion with gear ratio $R_1$, a modified signal is sent to motor 37 until the necessary angular velocity is achieved (boxes 148 and 150). The angular velocity is continuously monitored while the traverse motor is operated to weave the first belt portion, and modified signals are sent to the motor 37 as necessary (boxes 152 and 154).

The number of traverses are counted through encoder 124 operatively connected to the weaving head drive (box 156). When the number of traverses counted is equal to $GR_1$, which is the number of desired traverses for the first belt portion, then the apparatus has completed weaving the first belt portion and now proceeds to weave the next belt portion (boxes 158, 160, and 162).

The basic steps for weaving the first belt portion are then repeated, except with the parameter $W_2$, $R_2$, and $GR_2$ for the second belt portion.

An output signal is generated for the stepper motor for adjusting the amplitude of reciprocation to weave a belt of width $W_2$ (box 162).

An output signal is also sent to motor 37 for the angular velocity $V_2$, perhaps different from the first belt portion, to operate the weaving heads to weave a second belt portion of ratio $R_2$ (box 164). The angular velocity feedback signal from motor 37, is compared and the control signal thereto is corrected if necessary (boxes 166, 168, 170, and 172).

The motors 37 and 31 are thereafter substantially continuously operated, while the angular velocity of motor 37 is monitored and corrections made as necessary, until the proper number of traverses $GR_2$ have been counted and the second belt portion is completed (boxes 174, 176, 178, and 180).

Although it is not described in FIG. 3, it is understood that this process can be carried out for up to N belt portions.

Once the belt has been completed through all n portions, the weaving operation is stopped and the belt is doffed or removed from the weaving surface (boxes 182–184).

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. Apparatus for weaving a woven endless tire reinforcing belt for a single pneumatic tire from at least one coated continuous cord reinforcement laid on an endless weaving surface by reciprocating a reinforcement guide means while rotating said surface to lay said cord reinforcement on said surface in a zig-zag pattern across said belt from one side to the other of said belt, said apparatus comprising:
   (a) means for reading and storing information representative of said zig-zag pattern for first and second belt portions 1 and 2 forming said belt within the same tire, including the widths $W_1$ and $W_2$ of each portion; the cord angles $A_1$ and $A_2$ of each said portion; and the number of traverses $GR_1$ and $GR_2$ of each said portion respectively;
   (b) computer means for generating signals to control the weaving of said belt as represented by said information by first wearing said first belt portion of $GR_1$ traverses having width $W_1$ and cord angle $A_1$ and thereafter weaving said second belt portion of $GR_2$ traverses having width $W_2$ and cord angle $A_2$ on the radially outward side of said first portion;
   (c) first servomotor means for rotating said weaving surface, said first servomotor means being responsive to control signals generated by said computer means to rotate said weaving surface at an angular velocity controlled by said computer means;
   (d) first encoder means to provide a weaving surface angular velocity feedback signal to said computer means;
   (e) second servomotor means operatively connected to said guide means for reciprocating said guide means;
   (f) second encoder means operatively connected to said second servomotor means for monitoring the reciprocation of said guide means to provide a reciprocation feedback signal to said computer means, said computer means also for comparing said weaving surface angular velocity feedback signal and said reciprocation feedback signal with the cord angle of the belt portion being woven and generating a control signal to said reciprocation means to weave said belt portion having a corresponding gear ratio;

(g) stepper motor means operatively connected to said guide means for adjusting the amplitude of reciprocation of said guide means to thereby adjust the width of the belt portion being laid by said reciprocating means, said stepper motor means being responsive to control signals from said computer means to adjust said amplitude to first weave a belt portion of width $W_1$ and thereafter weave a belt portion of width $W_2$; and (h) third encoder means operatively connected to said guide means for counting the number of reciprocations of said guide means, said third encoder means being operatively connected to said computer means, said computer means for generating signals to said stepper motor means, said first servomotor means, and said second servomotor means to begin the weaving of said second belt portion when the number of traverses counted by said third encoder means is $GR_1$.

2. The apparatus of claim 1 wherein said computer means includes first and second control means, said first control means comprising a phase lock loop controller responsive to said second control means for synchronizing the reciprocation of said guide means with the rotation of said weaving surface in accordance with the cord angle of the belt portion being woven.

3. Apparatus for weaving a woven endless tire reinforcing belt for a single pneumatic tire on an endless weaving surface in a zig-zag pattern, said belt including a first belt portion having a substantially constant predetermined width and at least one additional belt portion within the same tire having a width narrower than said predetermined width on the radially outward side of said first portion, said apparatus comprising;

(a) input means for receiving information defining said zig-zag pattern, said information including belt width information for defining the width of said first belt portion and the narrower width of said additional belt portion;

(b) means for storing said information;

(c) computer means including at least one programmable microprocessor chip for reading said information and controlling the successive weaving of said belt portions as defined by said information;

(d) at least one endless weaving surface upon which said belt is woven, said weaving surface being continuously rotatable about an axis;

(e) at least one first servomotor for continuously rotating said weaving surface about said axis, and at least one encoding means for providing rotational feedback to said computer means, said first servomotor being responsive to said computer means;

(f) at least one reinforcement guide means for supplying cord reinforcement to said weaving surface;

(g) at least one second servomotor for reciprocating said guide means to effect the laying of said cord reinforcement on said weaving surface in said zig-zag pattern, and at least one encoding means for providing reciprocation feedback information to said computer means, said second servomotor being responsive to said computer means;

(h) means for limiting the amplitude of reciprocation over each belt portion forming period; and (i) at least one stepper motor responsive to said computer means for adjusting said limiting means, said stepper motor being responsive to at least one signal from said computer means to adjust said limiting means and hold said amplitude substantially constant over each said belt portion forming period;

said computer means for controlling said first and second servomotors and said stepper motor to reciprocative said guide means at a substantially constant predetermined amplitude for a first belt forming period in a timed relationship to the rotation of said weaving surface to effect the laying of said cord reinforcement on said surface in said zig-zag pattern in accordance with said pattern-defining information to weave a first belt portion having said substantially constant predetermined width and thereafter adjust said limiting means to weave said at least one additional, narrower belt portion for the same tire superposed thereon with substantially constant width.

4. The apparatus of claim 3, wherein further includes means operatively connected to said second servomotor for counting the number of reciprocations of said guide means, and said computer means is responsive to said counting means to terminate the weaving of a preselected belt portion after a predetermined number of reciprocations have been counted.

5. The apparatus of claim 4, wherein said pattern-defining information further comprises belt thickness information and belt cord angle information, and said computer means is responsive to said belt width information to control said stepper motor to limit said amplitude to weave a belt having a width defined by said belt width information; said computer means is further responsive to said belt thickness information to terminate weaving of said belt after a number of reciprocations have been counted that correspond to said thickness; and said computer means is further responsive to said belt cord angle information to control said first and second servomotors to lay said cord reinforcement on said weaving surface in timed relationship corresponding to said cord angle information.

6. The apparatus of claim 5, wherein said belt thickness information includes the number of transverses GR necessary to weave a belt of predetermined thickness, and said belt cord angle information comprises gear ratio information representative of a cord angle A, and said computer means is responsive to said information to control said first and second servomotors and said stepper motor to weave a belt wherein at least one of said belt portions is characterized approximately by the relationship $$\frac{C \cdot \tan A}{2 \cdot W} = \frac{EPI \cdot C \cdot D \cdot \sin A}{P \cdot M \pm 1} = GR$$

wherein C is the circumference of the belt, A is the smaller angle between the cord reinforcement and the edge of the reinforcing belt, W is the width of the belt portion measured perpendicular to the edges, EPI is the number of cord reinforcements per inch measured perpendicular to the cord length, P is an integer and equal to one plus the total number of interleaving lines parallel to and intermediate the edges of the reinforcing belt, M and D are two integers having no common factor, and which render $$\frac{P \cdot M \pm 1}{D}$$

an integer with D being less than P, and D and P have no common factor, GR is the number of repeating cycles of the cord reinforcement edge and back to the same edge for each circumference of said belt.

7. The apparatus of claim 6, wherein said information defines at least two belt portions, said first portion being characterized by a first predetermined width, a first predetermined thickness, and a first predetermined cord angle; and said second portion being characterized by a second predetermined width, a second predetermined thickness, and a second predetermined cord angle; and said computer means is responsive to said information to control said first and second servomotors and said stepper motor to weave said first belt portion and thereafter weave said second belt portion, whereby said belt comprises said second belt portion woven onto the radially outward side of said first belt portion.

8. Apparatus for weaving a woven endless tire reinforcing belt for a single pneumatic tire on an endless weaving surface in a zig-zag pattern, said belt including a first belt portion having a substantially constant predetermined width $W_1$ and having a predetermined number of traverses $GR_1$, and at least one additional belt portion for the same tire having a substantially constant predetermined width $W_n$ substantially different from said predetermined width $W_1$ and having a predetermined number of transverses $GR_n$, said apparatus comprising:

(a) input means for receiving pattern defining information defining said zig-zag pattern, said pattern defining information including width information $W_1 \ldots W_n$ for defining the respective widths of said first belt portion and said additional belt portions;

(b) means for storing said pattern defining information;

(c) programmable computer means for reading said pattern defining information and controlling the successive weaving of said belt portions as defined by said pattern defining information, said computer means including at least one microprocessor chip;

(d) at least one rotatable weaving drum having a substantially cylindrical weaving surface upon which said belt is woven;

(e) at least one first servomotor means operatively connected to said weaving drum for continuously rotating said weaving drum about a cylindrical axis thereof, said first servomotor means including at least one associated first encoding means for supplying rotational feedback information to said computer means representative of the rotation of said weaving drum, said first servomotor means being responsive to said computer means;

(f) first and second reciprocative reinforcement guide means for supplying cord reinforcement to the surface of said drum;

(g) at least one second servomotor means for reciprocating said first and second guide means to effect the laying of said cord reinforcement on said weaving drum surface in said zig-zag pattern, said second servomotor means being responsive to said computer means to reciprocate said first and second guide means to lay down belt portions having the number of traverses $GR_1 \ldots GR_n$, said second servomotor means also including at least one associated second encoding means for supplying reciprocation feedback information representative of the rate of reciprocation of said first and second guide means to said computer means;

(h) means for comparing said reciprocation feedback information with said pattern defining information;

(i) at least one stepper motor means for controlling the amplitude of reciprocation of said first and second guide means to a substantially constant amplitude for each belt portion, said stepper motor means being responsive to at least one signal from said computer means to hold said amplitude substantially constant over each belt portion forming period, said belt comprising at least one belt portion having a width corresponding to the amplitude of reciprocation of said guide means, and said stepper motor means being responsive to said computer means, whereby said computer means can control the width of said belt portion; and (j) a phase lock loop controller responsive to said computer means, said microprocessor chip responsive to said first and second encoding means, and said comparing means for controlling said first and second servomotor means and said stepper motor means to synchronize the reciprocation of said first and second guide means with the rotation of said weaving drum in accordance with a timed relationship to effect the laying of said cord reinforcement on said surface in said zig-zag pattern in accordance with said pattern defining information to weave a first belt portion of width $W_1$ and traverses $GR_1$ and to thereafter weave at least one belt portion of width $W_n$ and traverses $GR_n$ for said tire.

9. The apparatus of claim 8, which further includes means operatively connected to said second servomotor means for counting the number of reciprocations of said guide means, and said computer means is responsive to said counting means to terminate the weaving of a belt portion after a predetermined number of reciprocations have been counted.

* * * * *